United States Patent
Li et al.

(10) Patent No.: US 6,704,175 B2
(45) Date of Patent: Mar. 9, 2004

(54) CURRENT PERPENDICULAR-TO-THE-PLANE MAGNETORESISTANCE READ HEAD

(75) Inventors: Shuxiang Li, Saku (JP); Satoru Araki, Saku (JP)

(73) Assignee: TDK Corporation, Tokyo (JP)

( * ) Notice: Subject to any disclaimer, the term of this patent is extended or adjusted under 35 U.S.C. 154(b) by 202 days.

(21) Appl. No.: 09/903,698

(22) Filed: Jul. 13, 2001

(65) Prior Publication Data

US 2002/0159201 A1 Oct. 31, 2002

Related U.S. Application Data

(60) Provisional application No. 60/279,113, filed on Mar. 28, 2001.

(51) Int. Cl.[7] ................................................. G11B 5/39
(52) U.S. Cl. ............................. 360/324.11; 360/324.12
(58) Field of Search .................... 360/324.1, 324.11, 360/324.12, 324.2

(56) References Cited

U.S. PATENT DOCUMENTS

| | | | |
|---|---|---|---|
| 5,627,704 A | | 5/1997 | Lederman et al. |
| 5,668,688 A | | 9/1997 | Dykes et al. |
| 6,005,753 A | | 12/1999 | Fontana, Jr. et al. |
| 6,023,395 A | * | 2/2000 | Dill et al. ................. 360/324.2 |
| 6,114,850 A | * | 9/2000 | Hayashi ....................... 324/252 |
| 6,301,089 B1 | * | 10/2001 | Saito et al. ............. 360/324.12 |
| 6,473,279 B2 | * | 10/2002 | Smith et al. ............ 360/324.12 |

FOREIGN PATENT DOCUMENTS

| | | | |
|---|---|---|---|
| JP | 8-293107 | * | 11/1996 |

OTHER PUBLICATIONS

M.N. Baibich et al., "Giant Magnetoresistance of (001) Fe/(001) Cr Magnetic Superlattices". Physical Review Letters, vol. 61, No. 21, Nov. 21, 1998, pp. 2472–2475.
P. Dauguet et al., "Angular Dependence of the Perpendicular Giant Magnetoresistance of Multilayers". Physical Review B, vol. 54, No. 2, Jul. 1, 1996, pp. 1083–1087.
B. Dieny et al., "Giant Magnetoresistance in Soft Ferromagnetic Multilayers", Physical Review B, vol. 43, No. 1, Jan. 1, 1991, pp. 1297–1300.
W. P. Pratt, Jr., et al., "Perpendicular Giant Magnetoresistances of Ag/Co Multilayers", Physical Review Letters, vol. 66, No. 23, Jun. 10, 1991, pp. 3060–3063.
S.–F. Lee et al., "Two–Channel Analysis of CPP–MR Data For Ag/Co and AgSn/Co Multilayers", Journal of Magnetism and Magnetic Materials, vol. 118, 1993 pp. L1–L5.

* cited by examiner

*Primary Examiner*—David L. Ometz
(74) *Attorney, Agent, or Firm*—Morgan, Lewis & Bockius LLP

(57) ABSTRACT

A magnetoresistive (MR) head including, for example, a spin valve (SV) MR element having a sense current passing through the SV in a current-perpendicular-to-the-plane (CPP) mode. A free layer of the SV is transversely biased by a magnetostatic coupling field from an in-stack transverse bias layer. The transverse bias layer is separated from the free layer by a nonmagnetic high resistive spacer layer, which can cause strong spin memory loss and also provide a longitudinal biasing to the free layer of the SV. An out of stack longitudinal bias arrangement may alternatively be provided to impart a longitudinal bias to the free layer. The SV MR element comprises a MR promoting (MRP) layer either within in or adjacent to the free layer 90 or the pinned layer 110 This MR head structure provides enhanced linearity of the response to the magnetic field being sensed.

19 Claims, 4 Drawing Sheets

CURRENT PERPENDICULAR-TO-THE-PLANE MAGNETORESISTANCE READ HEAD

This application claims the benefit of a provisional application which was filed on Mar. 28, 2001 and assigned Provisional Application No. 60/279,113, which is hereby incorporated by reference.

BACKGROUND OF INVENTION

1. Field of Invention

The present invention relates to giant magnetoresistance ("GMR") transducers or read heads for reading magnetic signals from magnetic recording media, and more particularly, to current perpendicular-to-the-plane giant magnetoresistance ("CPP-GMR") designs. While the invention finds particular application in conjunction with reading hard disk drives, the invention can be implemented with other magnetic storage media. Moreover, the invention can be implemented in other magnetic field detection devices as well as in other devices and environments.

2. Description of the Related Art

Giant magnetoresistance (GMR) was initially described by Baibich et al. in Physical Review Letters, Volume 61, No. 21, pp. 2472–2475 (1988) which is hereby incorporated by reference. GMR occurs when an application of an external field causes a variation in the relative orientation of the magnetizations of neighboring ferromagnetic layers. This in turn causes a change in the spin-dependent scattering of conduction electrons, thereby changing the electrical resistance of the structure. The discovery of GMR triggered a wide study of transport properties of magnetic multilayers. In most cases, the current flows in the plane of the layers, called CIP-MR.

Pratt et al. extended the GMR measurements to the case where the current flows perpendicular-to-the-plane, called CPP-MR, as described by Pratt et al. in Physical Review Letters, Volume 66, pp. 3060 (1991), which is hereby incorporated by reference. In general, the CPP-MR effect is several times larger than the CIP-MR effect. For magnetoresistance (MR) read head applications, the CPP-MR element has to be dramatically scaled down (<100 nm) because of the very small specific resistance of the MR element with the CPP configuration.

U.S. Pat. No. 5,627,704 and U.S. Pat. No. 5,668,688 (which are both hereby incorporated by reference) have described the application of CPP-MR for magnetic transducers. In both cases, a longitudinal magnetic bias means was provided as usual by permanent magnets located at the sides of the GMR structures. With longitudinal magnetic bias, the GMR structure must be a spin valve type structure in order to have good linear response in the field of small signals.

In both CIP-MR and CPP-MR, the application of an external field causes a variation in the relative orientation of the magnetizations of neighboring ferromagnetic layers. As discussed above, this in turn causes a change in the spin-dependent scattering of conduction electrons and thus the electrical resistance of the structure. In order to apply CPP-MR for MR heads, a transverse magnetic bias to the CPP multilayer is required in order to achieve an optimum response.

The spin valve structure, as described by Dieny et al. in Physical Review B, Volume 43, pp. 1297 (1991), which is hereby incorporated by reference, discusses a conventional approach of using a GMR structure arranged in a CIP-MR mode within a hard disk drive arrangement. A standard spin valve comprises two ferromagnetic layers separated by a nonmagnetic spacer, such as a layer of Cu. The magnetization of one ferromagnetic layer is fixed by an adjacent antiferromagnetic layer or permanent magnetic layer, and is prevented from rotation in the presence of the field of interest. The magnetization of the other ferromagnetic layer is not fixed, and is thus free to rotate in the presence of an external field.

Essentially, the MR response varies as the cosine of the angle between the magnetizations in the two layers, resulting in a high linear density resolution. However, the SV type CIP-MR heads may nevertheless still not be suited for ultra-high areal density applications due to the inherent limitations resulting from the small read gap of such an arrangement.

U.S. Pat. No. 5,668,688 describes an application of current-perpendicular-to-the-plane (CPP) spin valve type MR transducers or heads, having shields that are also used as leads, resulting in a smaller read gap. Nevertheless, these designs are still not able to achieve an optimum linear response due to the lack of a transverse bias supply arrangement.

A satisfactory linear response can be achieved in a CIP mode SV type MR read head arrangement by utilizing an anti-parallel (AP)-pinned layer, where two ferromagnetic layers are antiferromagnetically coupled through a very thin antiferromagnetic spacer (AFS) such as a layer of Ru, Re, Ir, or Rh. The AFS is typically <1 nm. As shown in FIG. 1, by providing two AP sublayers (AP-pinned 1 and AP-pinned 2) with essentially the same magnetic moment, but arranged in opposite directions, the overall AP-pinned layer has a resultant net moment near zero. This results in a satisfactory SV linear response because of the very small magnetostatic coupling acting on the free layer. However, in a CPP-MR head, such a structure is not appropriate. According to a two current series resistor model described by Lee et al. in the Journal of Magnetism and Magnetic Materials, Vol. 118, pp. 118 (1993), the specific resistance change AΔR of this structure can be roughly estimated by:

$$A\Delta R = \frac{4[\beta_P \rho_P^*(t_{AP2} - t_{AP1}) + AR_{P/SP}^* \gamma_{P/SP}]}{(\beta_F \rho_F^* t_F + AR_{F/SP}^* \gamma_{F/SP})} \over {\rho_F^* t_F + \rho_{SP} t_{SP} + \rho_P^*(t_{AP2} + t_{AP1}) +} \atop {\rho_{AFS} t_{AFS} + AR_{F/SP}^* + AR_{P/SP}^* + 2AR_{P/AFS}^* +} \atop {AR_{Cap/F} + AR_{P/AF}}$$

where $\beta, \gamma, \rho$, and $AR_{x/y}$ are bulk spin asymmetry, interface spin asymmetry, resistivity and interface resistance, respectively. It can be seen that the AΔR is at a minimum value when the two AP sublayers have the same thickness. Such an arrangement is not desirable for a CPP-MR head. Accordingly, an SV structure having a single pinned layer may instead be preferred for CPP-MR head applications. However, as discussed above, a transverse bias supply is still desired in CPP-MR arrangements in order to achieve an optimum linear response.

SUMMARY OF THE INVENTION

Accordingly, the present invention is directed to a current perpendicular-to-the-plane magnetoresistance read head having transverse biasing and enhanced magnetoresistance that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a current perpendicular-to-the-plane magnetoresistance (CPP-MR) read head includes a spin valve arrangement and a transverse bias means for providing a transverse bias to the spin valve arrangement.

In another aspect, a magnetoresistance read head having a stacked structure includes a fixed layer having a magnetization direction pinned in a particular direction, a free layer having a magnetization that is free to rotate in varying directions, and an in-stack transverse bias arrangement providing a transverse bias to the free layer.

In another aspect, a method of magnetically biasing a current perpendicular-to-the-plane magnetoresistance (CPP-MR) read head having a stacked structure is provided. This method includes generating a current in a spin valve structure in the CPP-MR read head, and magnetically biasing a free layer of the spin valve structure in a transverse direction with an in-stack transverse bias arrangement.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

The present invention discloses both longitudinal and transverse magnetic bias means for the application of different types of GMR structures. The present invention includes a CPP GMR read head having a pair of shields, which also act as electrical leads to carry a sense current flowing perpendicular-to-the-plane of the device. A sense current provides either a longitudinal magnetic bias or a transverse magnetic bias to the GMR element in accordance with the requirements of the particular GMR structure.

To optimize the operating point and to reduce Barkhausen noise of a particular GMR structure, a longitudinal magnetic bias is provided to an SV type GMR structure.

It is to be appreciated that the GMR structure may include other types of SV structures such as those described in U.S. Pat. No. 5,668,688.

Figure 1:
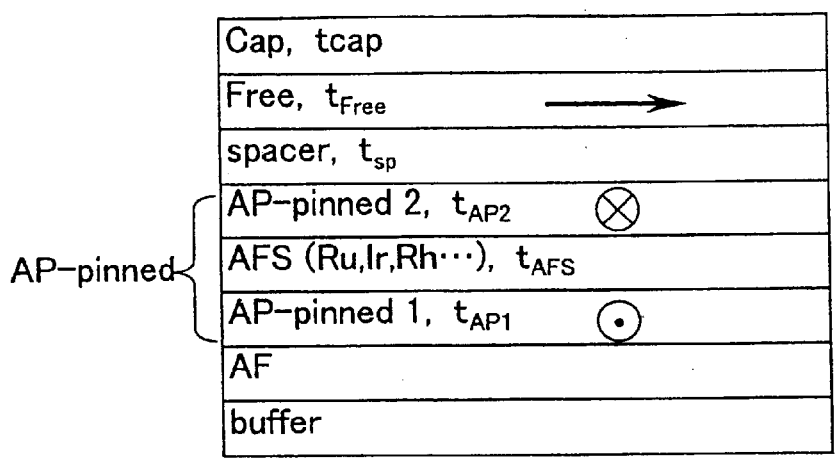
FIG. 1 is a schematic drawing of a spin valve arrangement having an anti-parallel (AP)-pinned layer.
Figure 2:
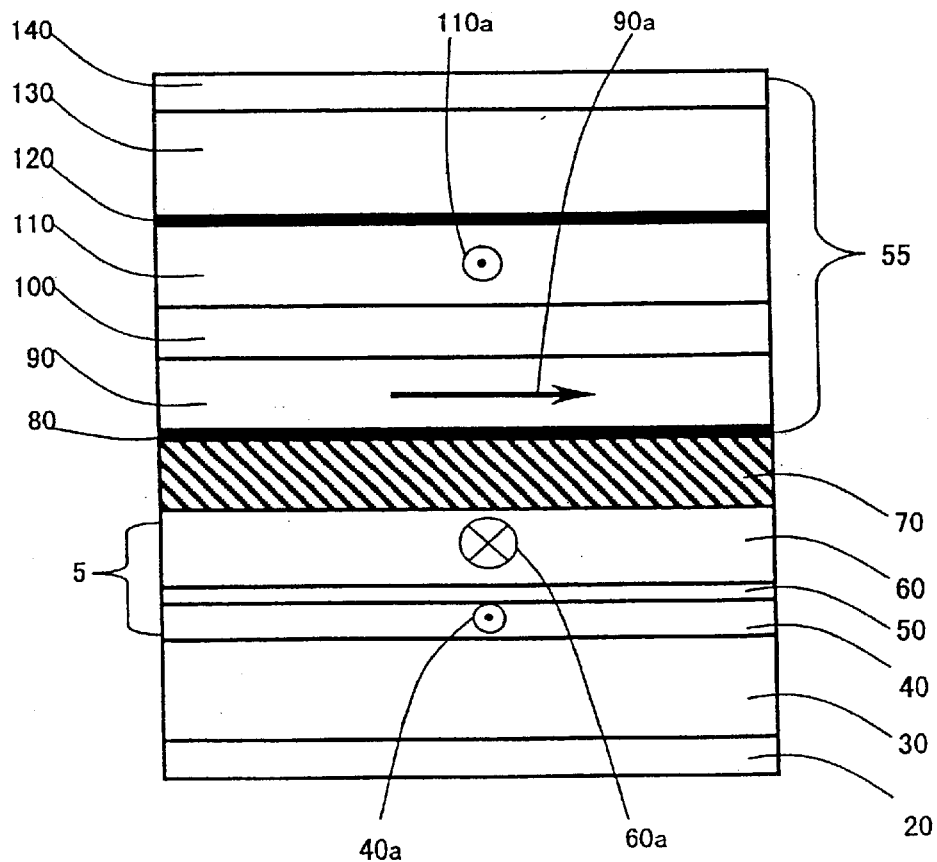
FIG. 2 is a schematic drawing of a laminated structure of the present invention including an active MR element, a conductive spacer layer, and an anti-parallel (AP)-bias layer.

FIG. 2 is a schematic drawing of a laminated structure of the present invention including an active MR element, a conductive spacer layer, and an anti-parallel (AP)-bias layer. The active MR element is a spin valve 55, for example, which includes magnetoresistive promoting (MRP) layer 80, free layer 90, spacer layer 100, pinned layer 110, MRP layer 120, exchange bias layer 130 and a cap layer 140. The MRP layers 80 and 120 are two thin MR promoting layers, which may be either magnetic or nonmagnetic. Typically, these layers have a respective thickness of about 10 angstroms. The MRP layers are composed of materials having a high resistivity and a high specular coefficient. The MRP layers provide a strong spin-reflecting layer for conduction electrons, resulting in an increase in the MR ratio of the overall MR structure because the spin-reflecting properties of the MRP layers do not change the spin direction of the conduction electrons. The resistivity of the MRP-layers 80 and 120 is typically 10 to 100 times the resistivity of normal conductive materials. While the MRP layer 80 is shown adjacent to the free layer 90 and the MRP layer 120 is shown adjacent to the pinned layer 110, these layers 80 and 120 could alternatively be inserted within the free layer 90 and the pinned layer 110, respectively.

For particular applications of the instant invention, as described below beginning with FIG. 3, MRP layer 80 can be composed of a metal layer of Cu, Ru, Re or Rh, for example. The free layer 90 may be made, for example, of either NiFe, NiFeX (X=Cr, Ta, Nb, Zr, Mo) or NiFe, NiFeX together with a Co-alloy at the interface with spacer layer 100. The spacer layer 100 may be made of Cu or Ag, for example. The pinned layer 110 may be made of Co, CoFe or CoFe-based alloys, for example. Its magnetization is pinned by the exchange layer 130, which may be made of Mn-based alloys such as PtMn, PtPdMn, RuRhMn and IrMn, for example.

The spin valve 55 is separated from an AP-bias layer 5 by a high-resistive, conductive, spacer layer such as either γ-Mn phase alloys FeMn, IrMn and RuRhMn, or PtMn, PtPdMn, for example. This conductive spacer layer causes strong spin memory loss and prevents additional opposite MR effect to the desired MR effect.

The AP-bias layer 5, for example, consists of two ferromagnetic layers 40 and 60 made of Co, CoFe or CoFe-based alloys, for example, and antiferromagnetically coupled through a thin antiferromagnetic spacer layer made of Ru, Re, Ir or Rh, for example. This spacer layer is <1 nm, for example. An antiferromagnetic layer 30 is included in the stack structure of FIG. 2 of the present invention to provide an exchange field to pin the AP-bias layer, ensuring that the magnetization of the AP-bias layer orients in the desired direction (represented by arrows 40a and 60a). This arrangement results in an in-stack transverse bias field being obtained by the magnetostatic coupling field from the AP-bias layer.

In this particular design, the net moment of the AP-bias layer 5 is aligned oppositely to the magnetization direction of the pinned layer 110 (represented by arrow 110a). The whole stack is deposited on top of a buffer layer 20, made of one of Ti, Zr, Nb, Hf, Ta, NiCr and Ta/NiFeX (X=Cr, Ta, Nb, Zr, Mo), for example, for providing texture promotion. An alternative to this particular design is to completely reverse the order of the stack structure described above.

Figure 3:
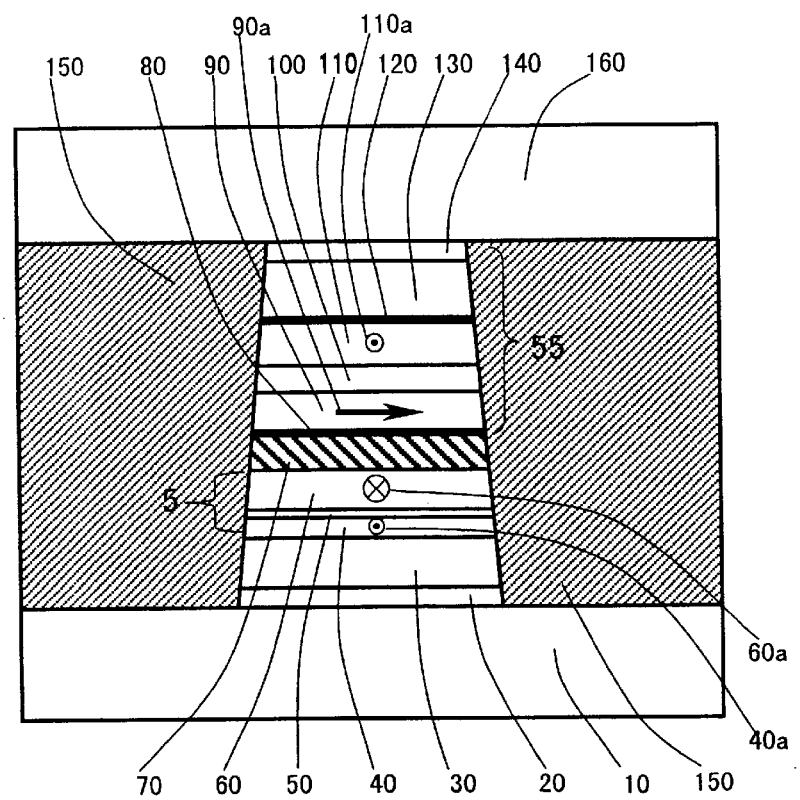
FIG. 3 is a schematic air-bearing surface (ABS) view of an embodiment of a CPP-MR head of the present invention.

FIG. 3 is a schematic air-bearing surface (ABS) view of an embodiment of a CPP-MR head of the present invention including the laminated structure of FIG. 2. The free layer 90 is subject to a transverse bias field generated by the in-stack AP-bias layer 5. The free layer 90 is also subject to a longitudinal bias field generated by the exchange field from in-stack spacer layer 70. Accordingly, at zero external field, the free layer magnetization is aligned longitudinally, as represented by arrow 90a. By adjusting the thickness of layer 70, and also by adjusting the material and thickness of MRP layer 80, the longitudinal bias on the free layer 90 can be optimized.

In this embodiment, for example, spacer layer 70 is made of γ-Mn phase alloys IrMn, RuRhMn and FeMn, for example, which is different from the antiferromagnetic material used for layer 30 and layer 130, made of PtMn and PtPdMn, for example. MRP layer 80 may be made of magnetic or nonmagnetic nano-oxide, Cu, Ru, Re and Rh, for example. The whole stack structure described above is disposed between bottom shield 10 and top shield 160, which are separated from each other by an oxide 150 made, for example, of $Al_2O_3$ or $SiO_2$. The shields 10 and 160 also serve as contact leads to carry the sense current passing through the whole stack in current-perpendicular-to-the-plane mode, as described above. The shields 10 and 160 may be comprised of, for example, CoZrNb, CoZrTa, or NiFeX (X=Cr, Ta, Nb, Zr, Mo). In this example, the buffer layer 20, antiferromagnetic layers 30 and 130, and cap layer 140 are serving as metal gaps. As a result of the arrangement of the instant invention, both longitudinal bias and transverse bias can be achieved in the entire stack and as a result of a single process, resulting in a simplification of the overall fabrication process of the MR heads.

Figure 4:
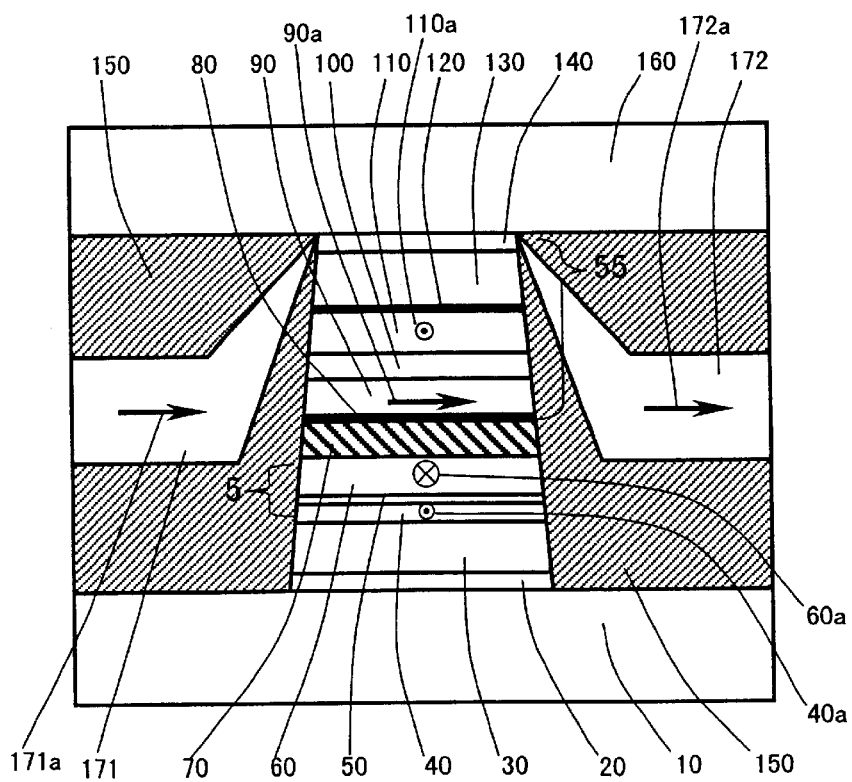
FIG. 4 is a schematic air-bearing surface (ABS) view of another embodiment of a CPP-MR head of present invention.

FIG. 4 is a schematic air-bearing surface (ABS) view of another embodiment of a CPP-MR head of present invention. This arrangement is referred to as a self-aligned design. Layers 10 to 160 are same as that described in the above-described arrangement of FIG. 3, with the exception of layer 70. In the arrangement of FIG. 4, layer 70 is also made of material that can cause strong spin memory loss such as PtMn, PtPdMn and γ-Mn phase alloys IrMn, RuRhMn and FeMn, for example. However, layer 70 in the FIG. 4 arrangement is relatively thin with a typical thickness less than 2.5 nm, leading to an enhanced in-stack transverse bias compared with the arrangement of FIG. 3. As a result of layer 70 being provided with a lower thickness in the FIG. 4 arrangement, an in-stack longitudinal bias is not available. Because of this, a separate longitudinal bias must be provided. This longitudinal bias is provided in the arrangement of FIG. 4 by layers 171 and 172 arranged so that their magnetizations are aligned longitudinally, as represented by arrows 171a and 172a in FIG. 4. Layers 171 and 172 may be permanent magnets, for example, made of Co—$Fe_2O_3$, CoPt, CoCrPt, CoCrTaPt together with an underlayer made of Ti, Zr, Nb, Hf, Ta, NiCr, Cr, CrTa, for example.

Figure 7:
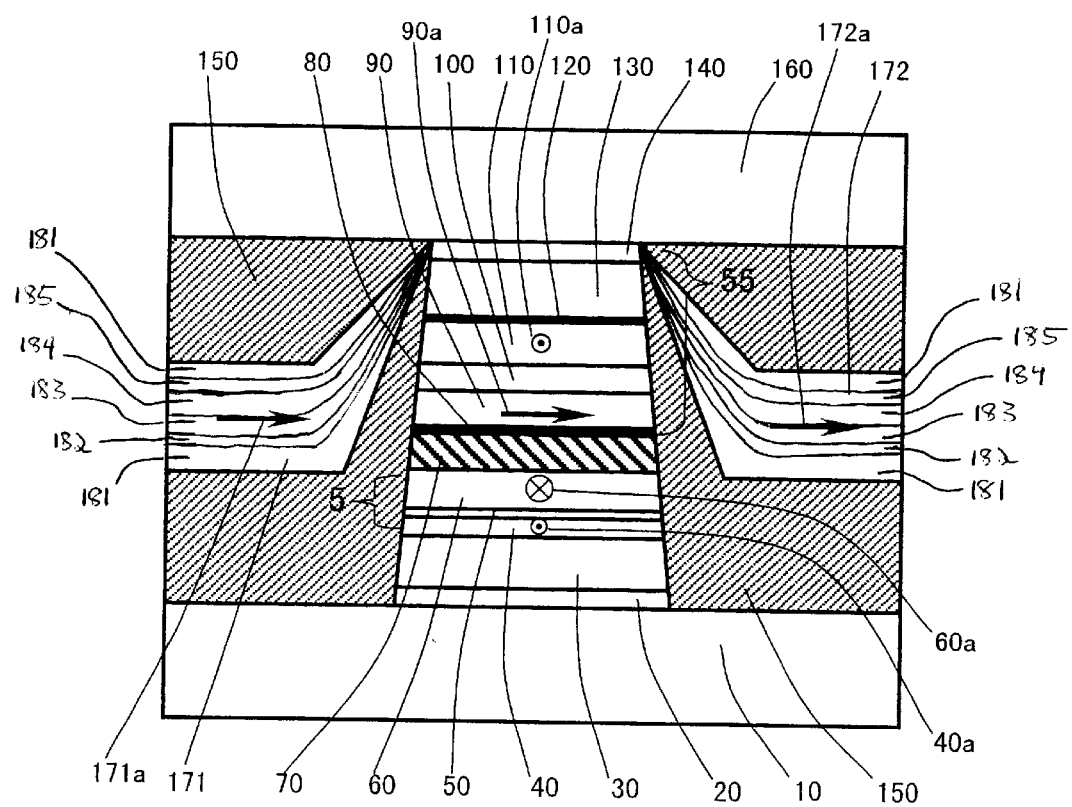
FIG. 7 is a schematic air-bearing surface (ABS) view of another embodiment of a CPP-MR head of the present invention.

FIG. 7 shows an embodiment of the self-aligned design of FIG. 4, in which layers 171 and 172 provide a longitudinal bias as in FIG. 4. The FIG. 7 arrangement differs from the FIG. 4 arrangement, however, in that the layers 171 and 172 are not permanent magnets, but are instead respectively composed of a ferromagnetic layer 183 exchange-biased along the longitudinal direction by an antiferromagnetic layer 184 such as γ-Mn phase alloys FeMn, IrMn or RuRhMn, for example. These materials in the antiferromagnetic layer 184 differ from the antiferromagnetic material used for antiferromagnetic layers 30 and 130. For providing texture to promote the longitudinal bias field, a buffer layer 182 made of Ti, Zr, Nb, Hf, Ta, NiCr, for example, and a cap layer 185 are needed. This stacked structure making up the layers 171 and 172 of FIG. 7 also include an oxide layer 181.

In the arrangements of FIGS. 4 and 7, the transverse biasing efficiency can be increased over that of the arrangement of FIG. 3 due to the decrease of the thickness of layer 70. At the same time, the longitudinal bias supply is relatively easy to fabricate due to the self-aligned design of these arrangements. Of course, embodiments other than those shown and described with regard to FIGS. 4 and 7 are contemplated that utilize other means for providing a longitudinal bias to the stacked structure. Also, the arrangements of FIGS. 3, 4 and 7 could alternatively be arranged so that their entire stack structure is completely reversed.

Figure 5:
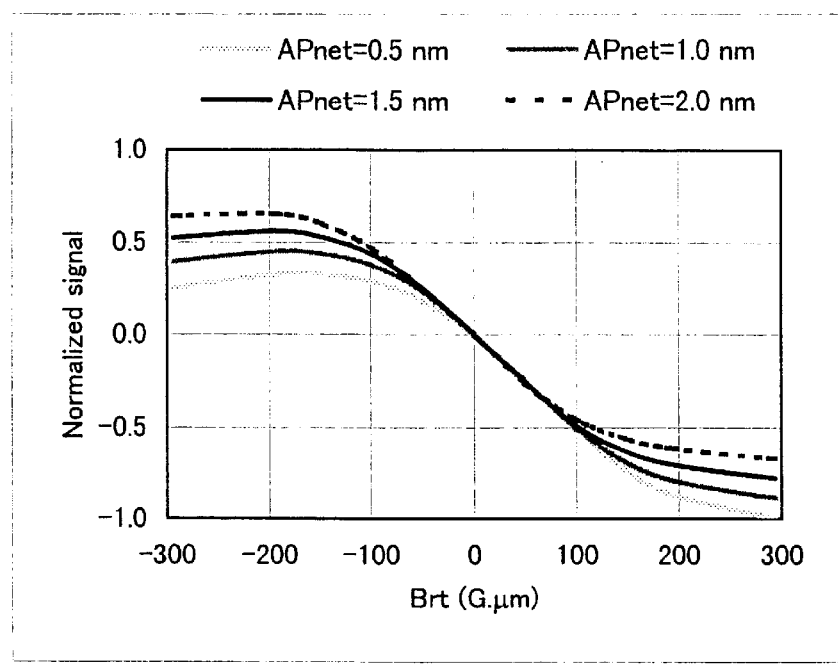
FIG. 5 is a graph showing transfer curves of CPP-MR heads of the arrangement of FIG. 4, in which different plots are shown to illustrate the results of providing the anti-parallel (AP)-bias layer with varying net moment values, as represented by the net difference between the respective thicknesses of the two ferromagnetic layers (APnet)

FIG. 5 is a graph showing normalized transfer curves of CPP-MR heads of the arrangement of FIG. 4, in which different plots are shown to illustrate the results of providing the anti-parallel (AP)-bias layer with varying net moment values, as represented by the net thickness/moment difference between the two ferromagnetic layers (APnet) of the AP-bias layer. In the arrangement associated with FIG. 4, the whole stack is composed as follows: Ta3/PtMn12/CoFe (1.5)/Ru0.4/CoFe(t)/IrMn2/NiFe4/Cu2.5/CoFe2/PtMn12/Ta3, where the numerals represent thickness of associated layers in nm and t changes from 2.0 to 3.5 nm. It can be seen from FIG. 5 that with increasing the net moment of the AP-bias layer (represented by the net thickness APnet), the transfer curve increases in symmetry, indicating the effect of the transverse biasing provided by the AP-bias layer. If the ferromagnetic layers of the AP-bias layer, having opposite magnetization directions as shown in the associated Figs., were the same thickness, and formed of the same material, then a net zero magnetic field would result. This is also referred to as a situation where the saturation magnetic moments of the ferromagnetic layers of the AP-bias layer are the same. Such an arrangement would not counter the effect of the fixed pinned layer 110 on the free layer 80. Accordingly, the ferromagnetic layers of the AP-bias layer are provided with different thicknesses with respect to each other, resulting in a particular APnet value, as shown and described with regard to FIG. 5.

Figure 6:
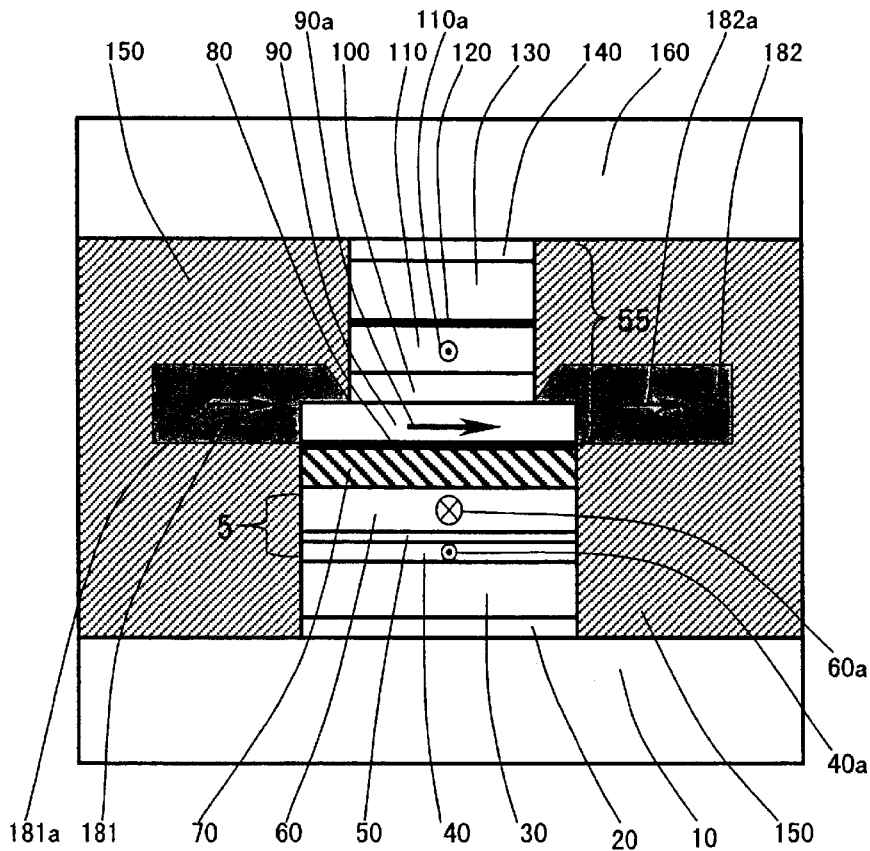
FIG. 6 is a schematic air-bearing surface (ABS) view of another embodiment of a CPP-MR head of present invention.

FIG. 6 is a schematic air-bearing surface (ABS) view of another embodiment of a CPP-MR head of present invention. Layers 10 to 160 are same as that described in the embodiment of FIG. 4, except that the free layer 90 of the spin valve and the stacked structure below the free layer 90 have two extension regions in the track direction that extend beyond the width of the spacer layer 100 and the stacked structure above the spacer layer 100.

The longitudinal bias in the FIG. 6 arrangement is provided by an overlaid structure, as shown by layers 181 and 182 arranged so that their moments are aligned longitudinally, as represented by arrows 181a and 182a. Layers 181 and 182 may be permanent magnets, for example, made of Co—$Fe_2O_3$, CoPt, CoCrPt, or CoCrTaPt together with an underlayer made of Ti, Zr, Nb, Hf, Ta, NiCr, Cr, or CrTa. Layers 181 and 182 may be also made of γ-Mn phase alloys FeMn, IrMn or RuRhMn, for example, which provide an exchange bias field to the free layer for longitudinal biasing. The γ-Mn phase alloy may be separated, for example, from the free layer by a spacer layer made of Cu, Re, Ru, Rh, Ti, Zr, Nb, Hf, Ta, or NiCr, for example, for both texture promotion and longitudinal bias field adjustment.

Accordingly, the instant invention provides a magnetoresistive (MR) head including, for example, a spin valve (SV) MR element having a sense current passing through the SV in a current-perpendicular-to-the-plane (CPP) mode. The SV MR element comprises a MR promoting (MRP) layer either within in or adjacent to the free layer 90 or the pinned layer 110 or within or adjacent to both of these layers. The MRP-layer of the instant invention is composed of magnetic or nonmagnetic materials having a high resistivity and a high specular coefficient. The free layer of the SV is transversely biased by a magnetostatic coupling field from an antiparallel (AP) bias layer. The AP-bias layer is separated from the free layer by a nonmagnetic high resistive spacer layer, which can cause strong spin memory loss. The AP-bias layer is in direct contact with an antiferromagnetic stabilization layer ensuring that the AP-bias layer is aligned in the desired direction perpendicular to the air-bearing surface. This structure is easy to fabricate and can provide enhanced linearity of the response to the magnetic field being sensed. Meanwhile, the free layer of the SV element may be automatically set at the middle of the read gap.

It will be apparent to those skilled in the art that various modifications and variations can be made in the apparatus and method relating to the current perpendicular-to-the-plane magnetoresistance read head of the present invention without departing from the spirit or scope of the invention. Thus, it is intended that the present invention cover the modifications and variations of this invention provided they come within the scope of the appended claims and their equivalents.

What is claimed is:

1. A current perpendicular-to-the-plane magnetoresistance (CPP-MR) read head having a stacked structure, comprising:
   a spin valve arrangement; and
   a transverse bias means for providing a transverse bias to the spin valve arrangement,
   wherein said transverse bias means is an in-stack anti-parallel bias (AP-bias) layer, and said in-stack AP-bias layer includes first and second ferromagnetic layers having magnetization directions arranged to be opposite from each other.

2. The CPP-MR read head of claim 1, further comprising:
   a longitudinal bias means for providing a longitudinal bias to the spin valve arrangement.

3. The CPP-MR read head of claim 2, wherein said longitudinal bias means is an in-stack conductive spacer layer.

4. A current perpendicular-to-the-plane magnetoresistance (CPP-MR) read head having a stacked structure, comprising:
   a spin valve arrangement;
   a transverse bias means for providing a transverse bias to the spin valve arrangement; and
   a longitudinal bias means for providing a longitudinal bias to the spin valve arrangement,
   wherein said longitudinal bias means is an in-stack conductive spacer layer, and said in-stack conductive spacer layer is composed of a material that causes a strong spin memory loss for conduction electrons passing through the CPP-MR read head.

5. A magnetoresistance read head having a stacked structure, comprising:
   a fixed layer having a magnetization direction pinned in a particular direction;
   a free layer having a magnetization that is free to rotate in varying directions; and
   an in-stack transverse bias arrangement providing a transverse bias to the free layer,
   wherein said in-stack transverse bias arrangement is an anti-parallel bias (AP-bias) layer, and said AP-bias layer includes first and second ferromagnetic layers having magnetization directions arranged to be opposite from each other.

6. The read head of claim 5, further comprising:
   a longitudinal bias arrangement providing a longitudinal bias to the free layer.

7. The read head of claim 6, wherein said longitudinal bias arrangement is an in-stack conductive spacer layer.

8. The read head of claim 5, further comprising:
   a magnetoresistance (MR) promoting layer composed of high resistivity materials and situated adjacent to the fixed layer.

9. The read head of claim 8, further comprising:
   a second magnetoresistance (MR) promoting layer composed of high resistivity materials and situated adjacent to the free layer.

10. The read head of claim 5, further comprising:
    a magnetoresistance (MR) promoting layer composed of high resistivity materials and situated within the fixed layer.

11. The read head of claim 10, further comprising:
    a second magnetoresistance (MR) promoting layer composed of high resistivity materials and situated within the free layer.

12. The read head of claim 5, wherein the free layer is wider than the pinned layer in a direction of a track to be read by the read head.

13. A magnetoresistance read head having a stacked structure, comprising:
    a fixed layer having a magnetization direction pinned in a particular direction;
    a free layer having a magnetization that is free to rotate in varying directions;
    an in-stack transverse bias arrangement providing a transverse bias to the free layer; and
    a longitudinal bias arrangement providing a longitudinal bias to the free layer,
    wherein said longitudinal bias arrangement is an in-stack conductive spacer layer, and said in-stack conductive spacer layer is composed of materials that cause a strong spin memory loss for conduction electrons passing through the read head.

14. A method of magnetically biasing a current perpendicular-to-the-plane magnetoresistance (CPP-MR) read head having a stacked structure, comprising:
    generating a current in a spin valve structure in the CPP-MR read head;
    magnetically biasing a free layer of the spin valve structure; and
    magnetically counter-biasing the free layer with an in-stack transverse bias arrangement,
    wherein the in-stack transverse bias arrangement used in the step of magnetically counter-biasing a free layer is an anti-parallel bias (AP-bias) layer, and the AP-bias layer used in the step of magnetically counter-biasing a free layer includes first and second ferromagnetic layers having magnetization directions arranged to be opposite from each other.

15. The method of claim 14, further comprising:
magnetically biasing the free layer of the spin valve structure in a longitudinal direction with a longitudinal bias arrangement.

16. The method of claim 15, wherein the longitudinal bias arrangement used in the step of magnetically biasing the free layer is an in-stack conductive spacer layer.

17. The method of claim 14, further comprising:
providing at least one magnetoresistance (MR) promoting layer composed of high resistivity materials within the stacked structure of the read head.

18. A method of magnetically biasing a current perpendicular-to-the-plane magnetoresistance (CPP-MR) read head having a stacked structure, comprising:
generating a current in a spin valve structure in the CPP-MR read head;
magnetically biasing a free layer of the spin valve structure;
magnetically counter-biasing the free layer with an in-stack transverse bias arrangement; and
magnetically biasing the free layer of the spin valve structure in a longitudinal direction with a longitudinal bias arrangement,
wherein the longitudinal bias arrangement used in the step of magnetically biasing the free layer is an in-stack conductive spacer layer, and the in-stack conductive spacer layer is composed of a material that causes a strong spin memory loss for conduction electrons passing through the CPP-MR read head.

19. A method of magnetically biasing a current perpendicular-to-the-plane magnetoresistance (CPP-MR) read head having a stacked structure, comprising:
generating a current in a spin valve structure in the CPP-MR read head;
magnetically biasing a free layer of the spin valve structure; and
magnetically counter-biasing the free layer with an in-stack transverse bias arrangement,
wherein the in-stack transverse bias arrangement used in the step of magnetically counter-biasing a free layer is an anti-parallel bias (AP-bias) layer, and the AP-bias layer used in the step of magnetically counter-biasing a free layer includes first and second ferromagnetic layers having magnetization directions arranged to be opposite from each other, and
wherein the first and second ferromagnetic layers of the AP-bias layer have respective saturation magnetic moments that differ from each other, so that an APnet value of the AP-bias layer is not zero.

* * * * *